United States Patent
Li et al.

(10) Patent No.: US 12,506,150 B2
(45) Date of Patent: Dec. 23, 2025

(54) NEGATIVE ELECTRODE SHEET AND BATTERY APPLYING SAME

(71) Applicant: CALB Co., Ltd., Jiangsu (CN)

(72) Inventors: Xuerui Li, Changzhou (CN); Yanting Chen, Changzhou (CN); Zhimin Wang, Changzhou (CN); Xuyi Shan, Changzhou (CN); Kui Li, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 495 days.

(21) Appl. No.: 18/084,496

(22) Filed: Dec. 19, 2022

(65) Prior Publication Data

US 2024/0145710 A1    May 2, 2024

(30) Foreign Application Priority Data

Oct. 27, 2022   (CN) .......................... 202211322203.3

(51) Int. Cl.
| | | |
|---|---|---|
| *H01M 4/587* | (2010.01) | |
| *H01M 4/02* | (2006.01) | |
| *H01M 4/04* | (2006.01) | |
| *H01M 4/133* | (2010.01) | |
| *H01M 4/62* | (2006.01) | |

(52) U.S. Cl.
CPC ......... *H01M 4/587* (2013.01); *H01M 4/0404* (2013.01); *H01M 4/0435* (2013.01); *H01M 4/0471* (2013.01); *H01M 4/133* (2013.01); *H01M 4/62* (2013.01); *H01M 2004/021* (2013.01); *H01M 2004/027* (2013.01)

(58) Field of Classification Search
CPC .. H01M 4/587; H01M 4/0404; H01M 4/0435; H01M 4/0471; H01M 4/135; H01M 4/62; H01M 2004/021; H01M 2004/027
See application file for complete search history.

(56) References Cited

U.S. PATENT DOCUMENTS

| | | | | |
|---|---|---|---|---|
| 2019/0305299 A1* | 10/2019 | Zhang | .................. | H01M 4/139 |
| 2021/0126257 A1* | 4/2021 | He | ....................... | H01M 4/366 |
| 2022/0399607 A1* | 12/2022 | Liu | ..................... | H01M 50/209 |
| 2023/0098119 A1* | 3/2023 | Li | ...................... | H01M 4/0404 429/209 |
| 2023/0223538 A1* | 7/2023 | Wang | ................ | H01M 10/0525 429/231.8 |
| 2023/0299277 A1* | 9/2023 | Jin | ...................... | H01M 10/052 429/209 |
| 2024/0063361 A1* | 2/2024 | Dou | ....................... | H01M 4/483 |
| 2024/0356012 A1* | 10/2024 | Jiang | .................... | H01M 4/587 |

FOREIGN PATENT DOCUMENTS

| | | |
|---|---|---|
| CN | 102931378 | 2/2013 |
| CN | 103515607 | 1/2014 |
| CN | 108767195 | 11/2018 |
| CN | 109301168 | 2/2019 |
| EP | 3614462 | 2/2020 |
| WO | 2022099457 | 5/2022 |

OTHER PUBLICATIONS

Machine Translation of CN103515607A (Jun. 19, 2025) (Year: 2025).*
Machine Translation of CN108767195A (Jun. 19, 2025) (Year: 2025).*
"Search Report of Europe Counterpart Application", issued on Sep. 21, 2023, p. 1-p. 8.
"Office Action of China Counterpart Application" with English translation thereof, issued on Nov. 29, 2022, p. 1-p. 19.
"Decision of Refusal of China Counterpart Application", issued on Feb. 10, 2023, with partial English translation thereof, pp. 1-11.
Office Action of China Counterpart Application, with English translation thereof, issued on Jan. 12, 2023, pp. 1-10.

* cited by examiner

*Primary Examiner* — Matthew J Merkling
(74) *Attorney, Agent, or Firm* — JCIP GLOBAL INC.

(57) ABSTRACT

A negative electrode sheet and a battery applying the same are provided. The negative electrode sheet includes a current collector and a negative electrode active coating disposed on two opposite surfaces of the current collector. The negative electrode active coating contains a negative electrode active material, and the negative electrode active material includes graphite. The negative electrode sheet satisfies $0.0025 \leq \varepsilon^*\rho/PD \leq 0.0065$, where $\varepsilon$ is a porosity of the negative electrode sheet, $\rho$ is a surface density of a single surface of the negative electrode sheet with a unit of $g/cm^2$, and PD is a compacted density of the negative electrode sheet with a unit of $g/cm^3$. The compacted density PD, the surface density $\rho$, and the electrode sheet porosity $\varepsilon$ of the negative electrode sheet form specific correlation relationships among one another.

10 Claims, No Drawings

NEGATIVE ELECTRODE SHEET AND BATTERY APPLYING SAME

CROSS-REFERENCE TO RELATED APPLICATION

This application claims the priority benefit of China application serial no. 202211322203.3, filed on Oct. 27, 2022. The entirety of the above-mentioned patent application is hereby incorporated by reference herein and made a part of this specification.

BACKGROUND

Technical Field

The disclosure belongs to the technical field of batteries, and in particular, relates to a negative electrode sheet and a battery applying the same.

Description of Related Art

Lithium-ion batteries exhibit the advantages of high working voltage, long cycle life, no memory effect, small self-discharging, and environmental friendliness. Therefore, lithium-ion batteries have been widely used in various portable electronic products and electric vehicles.

The electrode active material and its performance as the core of energy storage determine the overall performance of lithium-ion batteries. However, in the bulk phase of conventional graphite-based negative materials, lithium intercalation kinetics are poor, and lithium dendrites are easily formed during the charging and discharging process. Dendrites pierce the separator film and cause a short circuit between the positive and negative electrodes, causing battery failure and even safety accidents. Further, the formation of lithium dendrites is more likely to occur at high current densities, causing a series of safety issues.

SUMMARY

The disclosure provides a negative electrode sheet and a battery applying the same.

According to one aspect of the disclosure, a negative electrode sheet is provided. The negative electrode sheet includes a current collector and a negative electrode active coating disposed on two opposite surfaces of the current collector. The negative electrode active coating contains a negative electrode active material, and the negative electrode active material includes graphite. The negative electrode sheet satisfies $0.0025 \leq \varepsilon^* \rho/PD \leq 0.0065$, where $\varepsilon$ is a porosity of the negative electrode sheet, $\rho$ is a surface density of a single surface of the negative electrode sheet, and PD is a compacted density of the negative electrode sheet.

According to another aspect of the disclosure, a battery including a positive electrode sheet and the abovementioned negative electrode sheet is provided.

DESCRIPTION OF THE EMBODIMENTS

Through research, it is found that the charging capability of the battery is limited by the kinetic performance of the negative electrode sheet of the battery. Excessive compacted density of the negative electrode sheet leads to low porosity of the negative electrode sheet, which affects infiltration of the electrolyte solution. If the compacted density is excessively low, the contact resistance of the negative electrode sheet can also increase. When the surface density of the negative electrode sheet is low, the lithium ion transmission distance is shortened, which is beneficial to improve the kinetic performance of the negative electrode sheet. The tolerance limit for the compacted density of the negative electrode sheet can be widened, but the lower surface density is not conducive to the improvement of the energy density of the battery. However, when the surface density of the battery is high, the diffusion distance of lithium ions is large. Herein, if the compacted density is high and the porosity is low, the kinetic performance of the battery can be seriously reduced, which is not conducive to rate charging. Therefore, the design of the compacted density PD, surface density p, and porosity r of the electrode sheet is required to be considered comprehensively. Based on the above, a negative electrode sheet with a compacted density PD, a surface density p, and an electrode sheet porosity $\varepsilon$ satisfying $0.0025 \leq \varepsilon^* \rho/PD \leq 0.0065$ is provided. Such a negative electrode sheet is able to build a good transport pathway for lithium ions, is conducive to the rapid deintercalation of lithium ions, and has a high energy density. Further, such a negative electrode sheet has a low internal resistance, so that the polarization mismatch loss of a battery applying the same is reduced. Based on the reasons provided above, the battery applying the negative electrode sheet provided by the disclosure has favorable rate performance, kinetic performance, and cycle performance.

According to one aspect of the disclosure, a negative electrode sheet is provided. The negative electrode sheet includes a current collector and a negative electrode active coating disposed on a surface of the current collector. The negative electrode active coating contains a negative electrode active material, and the negative electrode active material includes graphite. The negative electrode sheet satisfies $0.0025 \leq \varepsilon^* \rho/PD \leq 0.0065$, where $\varepsilon$ is a porosity of the negative electrode sheet, $\rho$ is a surface density of the negative electrode sheet with a unit of $g/cm^2$, and PD is a compacted density of the negative electrode sheet with a unit of $g/cm^3$. The negative electrode sheet is able to build a good transport pathway for lithium ions, is conducive to the rapid deintercalation of lithium ions, and has a high energy density. Further, such a negative electrode sheet has a low internal resistance, so that the polarization mismatch loss of a battery applying the same is reduced.

Preferably, the negative electrode sheet satisfies $0.0030 \leq \varepsilon^* \rho/PD \leq 0.0055$. When the negative electrode sheet satisfies the above structural characteristics, the cycle life and kinetic performance of the battery applying the same are further improved.

Preferably, the porosity r of the negative electrode sheet=25% to 55%.

By controlling the porosity of the negative electrode sheet within the above range, the negative electrode sheet can have a higher reversible capacity, and it is also ensured that the battery applying the negative electrode sheet has good kinetic performance. When the porosity of the negative electrode sheet increases, abundant lithium ion transport pathways may be formed on the surface of the negative electrode sheet, and an electrolyte solution in the battery product applying the negative electrode sheet can fully wet the negative electrode sheet. The solvated lithium ions in the electrolyte solution can be rapidly transported on the surface of the negative electrode sheet. Therefore, in the process of charging the battery applying the negative electrode sheet at a high rate, the solvated lithium ions in the electrolyte solution are more easily to be inserted into the interior of the graphite. In this way, the deposition of lithium dendrites on the surface of the negative electrode is further prevented, so that the battery maintains good kinetic performance and can well adapt to high-rate charging. On the other hand, the porosity of the negative electrode sheet forms a specific relationship with the reversible capacity of the negative electrode sheet. The porosity of the negative electrode sheet increases, the contact area between the negative electrode active material and the electrolyte solution increases, and the interface reaction increases. Therefore, if the porosity of the negative electrode sheet is excessively large, the reversible capacity of the negative electrode sheet may be reduced instead.

Preferably, the porosity $\varepsilon$ of the negative electrode sheet=30% to 45%.

Preferably, the compacted density PD of the negative electrode sheet is 1.00 g/cm$^3$ to 1.80 g/cm$^3$. When the negative electrode sheet has the above compacted density, it is beneficial to increase the discharging capacity of the battery applying the same, reduce the internal resistance of the battery, reduce the polarization mismatch loss of the battery, prolong the cycle life of the battery, and improve the utilization rate of the lithium-ion battery. As the compacted density of the negative electrode sheet increases, the degree of extrusion between material particles may increase, and the porosity of the negative electrode sheet may decrease. Further, the wettability of the electrolyte solution of the negative electrode sheet may become poor, which may lead to a lower specific capacity of the material. Therefore, the liquid retention capacity of the battery applying the negative electrode sheet with excessively high compacted density is relatively poor. As the polarization of the battery increases during the cycle, the capacity decay may increase, and the internal resistance may also increase significantly. However, when the compacted density of the negative electrode sheet decreases, the distance between particles in the negative electrode active coating increases, the ion channel increases, and the liquid absorption of the electrolyte solution increases, which is conducive to the rapid movement of ions. However, if the compacted density of the negative electrode sheet is excessively small, since the distance between particles in the negative electrode active coating is excessively large, the contact probability and contact area between particles may be reduced, which is not conducive to electronic conduction. The decrease in conductivity affects high current discharging and increases discharging polarization.

Preferably, the compacted density PD of the negative electrode sheet is 1.20 g/cm$^3$ to 1.70 g/cm$^3$.

Preferably, the surface density p of the negative electrode sheet is 0.014 g/cm$^2$ to 0.024 g/cm$^2$. The negative electrode sheet with this surface density feature may be fully wetted by the electrolyte solution, and the battery product applying the same is able to maintain sufficient energy density. Therefore, the battery product applying the negative electrode sheet has good electrical properties. When the surface density of the negative electrode sheet decreases, the migration resistance of the surface of the negative electrode sheet to the ions and electrons in the electrolyte solution decreases, so that lithium ions can diffuse rapidly on the surface of the negative electrode sheet. Further, as the surface density decreases, the electrode sheet becomes thinner, and the changes caused by the continuous intercalation and extraction of lithium ions during charging and discharging to the structure of the electrode sheet also reduce. However, if the surface density of the negative electrode sheet is excessively low, the energy density of the battery applying the negative electrode sheet may be reduced, and its electrical performance may be significantly deteriorated. If the surface density of the negative electrode sheet is excessively high, the negative electrode active material on the negative electrode sheet may expand through cycles, which may cause the negative electrode sheet to be too thick, resulting in capacity decay of the battery product applying the same. In addition, excessively high surface density of the negative electrode sheet tends to cause a binder in the negative electrode active coating of the negative electrode sheet to float up during the drying process, resulting in a gradient binder distribution. In addition, the porosity of a surface layer of the negative electrode sheet may decrease, resulting in poor wettability of the electrolyte solution to the negative electrode sheet.

Preferably, the surface density $\rho$ of the negative electrode sheet is 0.015 g/cm$^2$ to 0.020 g/cm$^2$.

Preferably, the negative electrode active material is subjected to a pore-forming treatment by using a pore-forming agent, so that the porosity $\varepsilon$ of the negative electrode sheet=25% to 55%, Herein, the pore-forming agent includes at least one of paraffin microspheres, refined naphthalene, ammonium carbonate, ammonium bicarbonate, ammonium chloride, polyethylene oxide, and polymethacrylate.

Preferably, the operation of the pore-forming treatment comprises coating a negative-electrode active slurry containing the negative-electrode active material and the pore-forming agent on the surfaces of the current collector and baking at a temperature of 70° C. to 160° C.

Preferably, calculated by mass percentage, a proportion of the graphite in the negative electrode active coating is not less than 95%.

Preferably, the graphite includes at least one of natural graphite, artificial graphite, and composite graphite.

Preferably, the negative electrode sheet is prepared according to the following method. In S1, slurry mixing is performed. The negative electrode active material is mixed with other materials used to prepare a negative electrode slurry to prepare the negative electrode slurry. In S2, coating is performed. The negative electrode slurry is coated on the surface of the current collector, a thickness of the coating is controlled to be 140 μm to 260 μm, and baking is performed at 70° C. to 160° C. for 120 seconds to 900 seconds to obtain a semi-finished product. In S3, pressure rolling is performed. The semi-finished product is pressure rolled with a pressure rolling pressure of 20T to 60T.

According to another aspect of the disclosure, a battery including a positive electrode sheet and the abovementioned negative electrode sheet is provided. The battery has favorable rate performance, kinetic performance, and cycle performance.

In order to enable a person having ordinary skill in the art to better understand the solutions of the disclosure, the technical solutions in the embodiments of the disclosure will be clearly and completely described below. Apparently, the described embodiments are only some of the embodiments of the disclosure, not all of the embodiments.

Example 1

1. Preparation of Positive Electrode Sheet:

A positive electrode slurry was prepared as follows: A ternary positive electrode active material NCM622, conductive agent acetylene black, and a binder PVDF were added into a vacuum mixer according to the mass ratio of the ternary positive electrode active material NCM532: conductive agent acetylene black: binder PVDF=96:2:2 for mixing, a solvent NMP was then added to the mixed slurry, the mixed slurry was stirred under the action of the vacuum mixer until it was uniform, and the positive electrode slurry of this example was obtained.

The above positive electrode slurry was uniformly coated on both surfaces of a positive electrode current collector aluminum foil, dried at room temperature, transferred to an oven for further drying, and dried in the oven to obtain a semi-finished positive electrode sheet. The semi-finished positive electrode sheet was then cold pressed and cut to obtain the positive electrode sheet to be assembled.

2. Preparation of Negative Electrode Sheet:

A negative electrode slurry was prepared as follows: Negative electrode active material graphite, conductive agent acetylene black, a thickener CMC, and a binder SBR were added into a vacuum mixer according to the mass ratio of the negative electrode active material graphite (artificial graphite 100 wt %): the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 1.5% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.024 g/cm². Herein, the current collector used in this example was an electrolytic copper foil with a dyne value of 58 dyn/cm and a thickness of 10 μm. The electrode sheet after coating was directly put into an oven for drying, the drying temperature was 140° C., and the drying time was 600 seconds to obtain a semi-finished negative electrode sheet to be pressure-rolled.

In step two, the semi-finished negative electrode sheet to be rolled was cold-pressed, and the pressure roll pressure in the cold-pressing process was 54 T. The operation of the cold-pressing process was properly adjusted so that the compacted density of the semi-finished negative electrode sheet was 1.80 g/cm³, and the sheet was cut to obtain the negative electrode sheet to be assembled.

3. Preparation of Electrolyte Solution

Ethylene carbonate (EC), ethyl methyl carbonate (EMC), and diethyl carbonate (DEC) were mixed according to the volume ratio EC:EMC:DEC=1:1:1 to obtain an organic solvent. Next, the fully dried lithium salt LiPF6 was dissolved in the abovementioned organic solvent, and an electrolyte solution with a concentration of 1 mol/L was prepared.

4. Selection of Separator Film

In this example, a polyethylene film was selected as a separator film of the lithium-ion battery.

5. Lithium-ion Battery Assembly

The positive electrode sheet to be assembled, the separator film, and the negative electrode sheet to be assembled were stacked in sequence, so that the separator film was located between the positive and negative electrode sheets to for isolation, and a bare cell was obtained. The bare cell was placed in a battery casing, and the electrolyte solution was injected after drying. The lithium-ion battery was obtained through processes such as vacuum packaging, standing still, formation, and shaping.

Example 2

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (artificial graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 0.2% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.017 g/cm². Herein, the current collector used in this example was an electrolytic copper foil with a dyne value of 58 dyn/cm and a thickness of 10 μm. The electrode sheet after coating was directly put into an oven for drying, the drying temperature was 80° C., and the drying time was 250 seconds to obtain a semi-finished negative electrode sheet to be pressure-rolled.

In step two, the semi-finished negative electrode sheet to be rolled was cold-pressed, and the pressure roll pressure in the cold-pressing process was 50 T. The operation of the cold-pressing process was properly adjusted so that the compacted density of the semi-finished negative electrode sheet was 1.75 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Example 3

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (artificial graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 1.10% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.016 g/cm². Herein, the current collector used in this example was an electrolytic copper foil with a dyne value of 58 dyn/cm and a thickness of 10 μm. The electrode sheet after coating was directly put into an oven for drying, the drying temperature was 120° C., and the drying time was 500 seconds to obtain a semi-finished negative electrode sheet to be pressure-rolled.

In step two, the semi-finished negative electrode sheet to be rolled was cold-pressed, and the pressure roll pressure in the cold-pressing process was 30 T. The operation of the cold-pressing process was properly adjusted so that the compacted density of the semi-finished negative electrode sheet was 1.20 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Example 4

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (artificial graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. Pore-forming agent refined naphthalene was added to the mixed slurry, and the amount of refined naphthalene added was 0.7% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.014 g/cm². Herein, the current collector used in this example was an electrolytic copper foil with a dyne value of 58 dyn/cm and a thickness of 10 μm. The electrode sheet after coating was directly put into an oven for drying, the drying temperature was 100° C., and the drying time was 400 seconds to obtain a semi-finished negative electrode sheet to be pressure-rolled.

In step two, the semi-finished negative electrode sheet to be rolled was cold-pressed, and the pressure roll pressure in the cold-pressing process was 35 T. The operation of the cold-pressing process was properly adjusted so that the compacted density of the semi-finished negative electrode sheet was 1.60 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Example 5

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (artificial graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 0.7% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.020 g/cm². Herein, the current collector used in this example was an electrolytic copper foil with a dyne value of 58 dyn/cm and a thickness of 10 μm. The electrode sheet after coating was directly put into an oven for drying, the drying temperature was 100° C., and the drying time was 350 seconds to obtain a semi-finished negative electrode sheet to be pressure-rolled.

In step two, the semi-finished negative electrode sheet to be rolled was cold-pressed, and the pressure roll pressure in the cold-pressing process was 47 T. The operation of the cold-pressing process was properly adjusted so that the compacted density of the semi-finished negative electrode sheet was 1.70 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Example 6

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (artificial graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 0.8% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.016 g/cm$^2$. Herein, the current collector used in this example was an electrolytic copper foil with a dyne value of 58 dyn/cm and a thickness of 10 μm. The electrode sheet after coating was directly put into an oven for drying, the drying temperature was 105° C., and the drying time was 450 seconds to obtain a semi-finished negative electrode sheet to be pressure-rolled.

In step two, the semi-finished negative electrode sheet to be rolled was cold-pressed, and the pressure roll pressure in the cold-pressing process was 32 T. The operation of the cold-pressing process was properly adjusted so that the compacted density of the semi-finished negative electrode sheet was 1.60 g/cm$^3$, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Example 7

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (natural graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 10% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.018 g/cm$^2$. Herein, the current collector used in this example was an electrolytic copper foil with a dyne value of 58 dyn/cm and a thickness of 10 μm. The electrode sheet after coating was directly put into an oven for drying, the drying temperature was 120° C., and the drying time was 500 seconds to obtain a semi-finished negative electrode sheet to be pressure-rolled.

In step two, the semi-finished negative electrode sheet to be rolled was cold-pressed, and the pressure roll pressure in the cold-pressing process was 36 T. The operation of the cold-pressing process was properly adjusted so that the compacted density of the semi-finished negative electrode sheet was 1.65 g/cm$^3$, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Example 8

In this example, a lithium-ion battery was prepared with reference to the method provided in Example 1. The difference between this example and Example 1 lies in the preparation of the negative electrode sheet, and the preparation method of the negative electrode sheet in this example is as follows:

A negative electrode slurry was prepared as follows: Negative electrode active material graphite (natural graphite 50 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 10% of the total mass of the negative electrode slurry. The mixed slurry was stirred under the action of the vacuum mixer until it was uniform, and the negative electrode slurry of this example was obtained. The negative electrode sheet was prepared by using the above negative electrode slurry according to the following steps:

In step one, the negative electrode slurry obtained in this example was evenly coated on both surfaces of a negative electrode current collector copper foil, and the surface density of the active coating was controlled to be 0.021 g/cm$^2$. Herein, the current collector used in this example was an electrolytic copper foil with a dyne value of 58 dyn/cm and a thickness of 10 μm. The electrode sheet after coating was directly put into an oven for drying, the drying temperature was 115° C., and the drying time was 450 seconds to obtain a semi-finished negative electrode sheet to be pressure-rolled.

In step two, the semi-finished negative electrode sheet to be rolled was cold-pressed, and the pressure roll pressure in the cold-pressing process was 42 T. The operation of the cold-pressing process was properly adjusted so that the compacted density of the semi-finished negative electrode sheet was 1.68 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this example are all consistent with those of Example 1, and the lithium-ion battery of this example is obtained.

Comparative Example 1

In this comparative example, a lithium-ion battery was prepared with reference to the method provided in Example 1. The difference between this comparative example and Example 1 lies in the preparation of the negative electrode sheet, and the preparation method of the negative electrode sheet in this comparative example is as follows:

A negative electrode slurry was prepared as follows: Negative electrode active material graphite (artificial graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 1.9% of the total mass of the negative electrode slurry. The mixed slurry was stirred under the action of the vacuum mixer until it was uniform, and the negative electrode slurry of this comparative example was obtained. The negative electrode sheet was prepared by using the above negative electrode slurry according to the following steps:

In step one, the negative electrode slurry obtained in this comparative example was evenly coated on both surfaces of a negative electrode current collector copper foil, and the surface density of the active coating was controlled to be 0.025 g/cm². Herein, the current collector used in this comparative example was an electrolytic copper foil with a dyne value of 58 dyn/cm and a thickness of 10 μm. The electrode sheet after coating was directly put into an oven for drying, the drying temperature was 160° C., and the drying time was 900 seconds to obtain a semi-finished negative electrode sheet to be pressure-rolled.

In step two, the semi-finished negative electrode sheet to be rolled was cold-pressed, and the pressure roll pressure in the cold-pressing process was 39 T. The operation of the cold-pressing process was properly adjusted so that the compacted density of the semi-finished negative electrode sheet was 1.65 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this comparative example are all consistent with those of Example 1, and the lithium-ion battery of this comparative example is obtained.

Comparative Example 2

In this comparative example, a lithium-ion battery was prepared with reference to the method provided in Example 1. The difference between this comparative example and Example 1 lies in the preparation of the negative electrode sheet, and the preparation method of the negative electrode sheet in this comparative example is as follows:

A negative electrode slurry was prepared as follows: Negative electrode active material graphite (natural graphite 100 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 0.1% of the total mass of the negative electrode slurry. The mixed slurry was stirred under the action of the vacuum mixer until it was uniform, and the negative electrode slurry of this comparative example was obtained. The negative electrode sheet was prepared by using the above negative electrode slurry according to the following steps:

In step one, the negative electrode slurry obtained in this comparative example was evenly coated on both surfaces of a negative electrode current collector copper foil, and the surface density of the active coating was controlled to be 0.015 g/cm². Herein, the current collector used in this comparative example was an electrolytic copper foil with a dyne value of 58 dyn/cm and a thickness of 10 μm. The electrode sheet after coating was directly put into an oven for drying, the drying temperature was 70° C., and the drying time was 120 seconds to obtain a semi-finished negative electrode sheet to be pressure-rolled.

In step two, the semi-finished negative electrode sheet to be rolled was cold-pressed, and the pressure roll pressure in the cold-pressing process was 60 T. The operation of the cold-pressing process was properly adjusted so that the compacted density of the semi-finished negative electrode sheet was 1.90 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this comparative example are all consistent with those of Example 1, and the lithium-ion battery of this comparative example is obtained.

Comparative Example 3

In this comparative example, a lithium-ion battery was prepared with reference to the method provided in Example 1. The difference between this comparative example and Example 1 lies in the preparation of the negative electrode sheet, and the preparation method of the negative electrode sheet in this comparative example is as follows:

A negative electrode slurry was prepared as follows: Negative electrode active material graphite (natural graphite 50 wt %), conductive agent acetylene black, a thickener CMC, and a binder SBR were added into a vacuum mixer according to the mass ratio of the negative electrode active material graphite: the conductive agent acetylene black: the thickener CMC: the binder SBR=96.4:1:1.2:1.4 for mixing, and to the mixture thus obtained was then added solvent deionized water. A pore-forming agent polyethylene oxide was added to the mixed slurry, and the amount of polyethylene oxide added was 1.7% of the total mass of the negative electrode slurry. The mixed slurry was stirred under the action of the vacuum mixer until it was uniform, and the negative electrode slurry of this comparative example was obtained. The negative electrode sheet was prepared by using the above negative electrode slurry according to the following steps:

In step one, the negative electrode slurry obtained in this comparative example was evenly coated on both surfaces of a negative electrode current collector copper foil, and the surface density of the active coating was controlled to be 0.013 g/cm². Herein, the current collector used in this comparative example was an electrolytic copper foil with a dyne value of 58 dyn/cm and a thickness of 10 μm. The electrode sheet after coating was directly put into an oven for drying, the drying temperature was 150° C., and the drying time was 800 seconds to obtain a semi-finished negative electrode sheet to be pressure-rolled.

In step two, the semi-finished negative electrode sheet to be rolled was cold-pressed, and the pressure roll pressure in the cold-pressing process was 20 T. The operation of the cold-pressing process was properly adjusted so that the compacted density of the semi-finished negative electrode sheet was 1.00 g/cm³, and the sheet was cut to obtain the negative electrode sheet to be assembled.

The preparation of the positive electrode sheet, the preparation of the electrolyte solution, the selection of the separator film, and the assembly of the lithium-ion battery involved in this comparative example are all consistent with those of Example 1, and the lithium-ion battery of this comparative example is obtained.

TEST EXAMPLE

1. Test objects: The negative electrode sheets and lithium-ion batteries prepared in Examples 1 to 8 and Comparative Examples 1 to 3 were used as the test objects of this test example, and relevant parameters and performance tests were carried out.

2. Test Content:

(1) Electrode Sheet Porosity Test:

The porosity $\varepsilon$ of the negative electrode sheet was obtained by the difference-of-mass method. The electrode sheet was cut into a disc with a radius r of 0.95 cm with an electrode sheet punching machine, and the thicknesses of the electrode sheet and the current collector were measured as L and L0 with a thickness gauge, and the volume of the negative active material on the electrode sheet was calculated $V=\pi*r2*(L-L0)$, and was then cut. The mass of the cut electrode sheet was weighed with a balance with an accuracy of 0.00001 g and recorded as m1; the electrode sheet was soaked in hexadecane for 1 h (completely immersed in it), and the electrode sheet is taken out with tweezers. After the electrode sheet was blotted dry with filter paper to a constant mass, it was weighed with a balance and recorded as m2, and the experimental data was substituted into the formula for calculation: $\varepsilon=(m2-m1)/(V*\rho0)*100\%$, where $\rho0$ is the density of hexadecane 0.7734 g/cm³, and the porosity $\varepsilon$ of the electrode sheet was obtained.

(2) Cycle Performance Test:

At 25° C., the lithium-ion battery as the test object was subjected to a cycle test according to the following procedures: Full charging and discharging at 1C rate was carried out until the capacity of the lithium-ion battery was less than 80% of the initial capacity, and the number of cycles was recorded.

(3) Direct Current Resistance (DCR) Test:

The lithium-ion battery as the test object was cycled at 25° C. to 200 cls, and the lithium-ion battery was adjusted to 50% SOC and discharged at a current rate of 1C for 18S. The battery voltage U2 before the discharging was stopped, the current I, and the battery voltage U1 after the battery voltage stabilized were recorded, and calculation was performed according to the formula R=(U2−U1)/I to obtain the DC internal resistance R.

(4) Kinetic Performance Test:

The lithium-ion battery as the test object was cycled to 1,000 cls at 25° C., and the lithium-ion battery was adjusted to 100% SOC at a current rate of 1C. The negative electrode sheet in the lithium-ion battery was then disassembled, and the lithium deposition on the surface of the negative electrode sheet was observed. Herein, lithium deposition area on the surface of the negative electrode sheet being less than 10% is considered as slight lithium deposition, lithium deposition area on the surface of the negative electrode sheet being between 10% and 50% is considered as moderate lithium deposition, and lithium deposition area on the surface of the negative electrode sheet being greater than 50% is considered severe lithium deposition.

3. Test Results:

The test results are shown in Table 1.

TABLE 1

Performance Test Results of Test Objects in this Test Example

| Test Object | Surface density of negative electrode sheet ρ (g/cm²) | Compacted density of negative electrode sheet PD (g/cm³) | ρ/PD (cm) | Porosity of negative electrode sheet ε (%) | ε*ρ/PD (cm) | Kinetic performance | DC resistance R (mΩ) | Number of cycles |
|---|---|---|---|---|---|---|---|---|
| Example 1 | 0.024 | 1.80 | 0.0133 | 48.6% | 0.0065 | slight lithium deposition | 465.78 | 1987 |
| Example 2 | 0.017 | 1.75 | 0.0097 | 25.8% | 0.0025 | slight lithium deposition | 440.41 | 2396 |
| Example 3 | 0.016 | 1.20 | 0.0133 | 41.3% | 0.0055 | no lithium deposition | 422.00 | 2683 |
| Example 4 | 0.014 | 1.60 | 0.0088 | 34.1% | 0.0030 | no lithium deposition | 416.83 | 2832 |
| Example 5 | 0.020 | 1.70 | 0.0118 | 34.0% | 0.0040 | no lithium deposition | 399.20 | 2778 |
| Example 6 | 0.016 | 1.60 | 0.0100 | 37.3% | 0.0036 | no lithium deposition | 380.90 | 2816 |
| Example 7 | 0.018 | 1.65 | 0.0109 | 42.5% | 0.0047 | no lithium deposition | 404.85 | 2743 |

TABLE 1-continued

Performance Test Results of Test Objects in this Test Example

| Test Object | Surface density of negative electrode sheet ρ (g/cm²) | Compacted density of negative electrode sheet PD (g/cm³) | ρ/PD (cm) | Porosity of negative electrode sheet ε (%) | ε*ρ/PD (cm) | Kinetic performance | DC resistance R (mΩ) | Number of cycles |
|---|---|---|---|---|---|---|---|---|
| Example 8 | 0.021 | 1.68 | 0.0125 | 39.5% | 0.0049 | no lithium deposition | 377.41 | 2935 |
| Comparative Example 1 | 0.025 | 1.65 | 0.0152 | 56.0% | 0.0085 | moderate lithium deposition | 542.47 | 843 |
| Comparative Example 2 | 0.015 | 1.90 | 0.0079 | 24.0% | 0.0019 | severe lithium deposition | 583.84 | 512 |
| Comparative Example 3 | 0.013 | 1.00 | 0.0130 | 52.6% | 0.0068 | slight lithium deposition | 502.37 | 1159 |

Regarding the porosity of the negative electrode sheet, on the one hand, as the porosity of the negative electrode sheet increases, the lithium ion transport pathway of the negative electrode sheet is smooth, the wettability of the electrolyte solution increases, and the liquid-phase conduction speed of active ions becomes faster. During high-rate charging, active ions are more easily intercalated into graphite, the formation of dendrites is prevented from occurring on the surface of the negative electrode. Therefore, as the porosity of the negative electrode sheet increases, and the kinetic performance of the battery increases, which is beneficial to the high-rate charging of the battery. On the other hand, the porosity of the graphite electrode sheet forms a specific relationship with the reversible capacity of the negative electrode. As the porosity increases, the contact area between graphite and electrolyte solution increases, and the interface reaction increases, resulting in a decrease in the reversible capacity.

The porosity of the electrode sheet is closely related to the compacted density. As the compacted density increases, the degree of extrusion between material particles may increase. As such, the porosity of the electrode sheet may decrease, and the wettability of the electrolyte solution of the electrode sheet may become poor. As such, the specific capacity of the material is lowered, and the liquid retention capacity of the battery is deteriorated. As the polarization of the battery increases during the cycle, the capacity decay may increase, and the internal resistance may also increase significantly. However, when the compacted density decreases, the distance between particles increases, the ion channel increases, and the liquid absorption of the electrolyte solution increases, which is conducive to the rapid movement of ions. However, if the compacted density is excessively small and the distance between particles is excessively large, the contact probability and contact area between particles may be reduced, which is not conducive to electronic conduction. The decrease in conductivity affects high current discharging and increases discharging polarization. Therefore, a suitable compacted density can increase the discharging capacity of the battery, reduce the internal resistance, reduce the polarization mismatch loss, prolong the cycle life of the battery, and improve the utilization rate of the lithium-ion battery.

Regarding the surface density of the negative electrode sheet, the reduction of the surface density can increase the diffusion rate of lithium ions and reduce the resistance to ion and electron migration. As the surface density decreases, the electrode sheet becomes thinner, and the changes caused by the continuous intercalation and extraction of lithium ions during charging and discharging to the structure of the electrode sheet also reduce. However, if the surface density is excessively low, the energy density of the battery may be reduced, and the costs of battery production and application may thus grow. Conversely, if the surface density is excessively high, the graphite in the negative electrode active material may swell significantly after cycling, and this situation is called the thickness rebound of the negative electrode sheet. The thickness rebound of the negative electrode sheet may cause the battery to be excessively thick, and risks of battery capacity decay and the like may occur. In addition, the high surface density is easy to make the binder float up during the drying process of the electrode sheet, resulting in a gradient binder distribution, and the porosity of the surface layer of the electrode sheet may be reduced. As a result, the wettability of the electrode sheet is deteriorated, and the conductivity of the surface layer of the electrode sheet is reduced, so it is necessary to comprehensively consider the surface density.

In the test batteries provided in Examples 1 to 8, the compacted density PD, the surface density ρ, and the electrode sheet porosity ε used in the negative electrode sheet satisfy $0.0025 \leq \varepsilon*\rho/PD \leq 0.0065$. Such a negative electrode sheet can build a good transport pathway for lithium ions, which is conducive to the rapid deintercalation of lithium ions. Further, such a negative electrode sheet has a low internal resistance, so that the polarization mismatch loss of the battery applying the same is reduced. Based on the reasons provided above, the battery applying the negative electrode sheet provided by the disclosure has favorable rate performance, kinetic performance, and cycle performance. In the above examples, the structural feature of the negative electrode sheet in the test lithium battery provided in each of Examples 3 to 8 further satisfies $0.0030 \leq \varepsilon*\rho/PD \leq 0.0055$, and the corresponding battery cycle life and kinetics are further improved.

At low rates, specific resistance, charge transfer, and contact resistance all play an important role in the electrochemical performance of the battery. At higher rates, the electrochemical performance of the battery is mainly limited by the diffusion of lithium ions in the electrolyte solution (kinetics). Reducing the porosity of the electrode or increasing the thickness (surface density/compacted density) of the electrode may increase the specific resistance, charge transfer, and contact resistance, while reducing the effective diffusion rate of Li ions in the electrolyte solution. That is, the greater the porosity of the electrode sheet, the smaller the impedance; the larger the thickness of the electrode sheet, the greater the impedance. For instance, in Table 1, the test negative electrode sheets provided by Example 1 and Example 3 have the same electrode thickness (p/PD), but the s of Example 1 is higher. During the battery performance test, slight lithium precipitation occurred in the test lithium battery of Example 1, but no lithium precipitation was found in the test lithium battery of Example 3. This shows that compared with the test lithium battery of Example 1, the kinetic performance of the test lithium battery of Example 3 is better. In addition, by comparing the DC impedance and the number of cycles corresponding to the two, it is found that the DC impedance of Example 1 is larger and the number of cycles is less. This shows that compared with the test lithium battery of Example 1, the test lithium battery of Example 3 has better cycle performance.

The structures of the test lithium batteries provided in Comparative Examples 1 to 3 did not satisfy $0.0030 \leq \varepsilon^* \rho/PD \leq 0.0055$. Therefore, compared to the abovementioned examples, the test lithium batteries provided in Comparative Examples 1 to 3 have larger DC resistance values, fewer cycles, and obvious lithium deposition.

The negative electrode sheet prepared in Comparative Example 1 has a higher surface density, and the thickness of the electrode sheet is increased. That is, the electron transmission distance increases, and the electron internal resistance increases, which reduces the reaction rate and migration rate of lithium ions during the electrochemical reaction. The porosity increases, the interface reaction with the electrolyte solution increases, and the interface resistance increases. When the test lithium battery in Comparative Example 1 is charged with a large current, lithium ions are not easy to escape from the material, which easily causes polarization, reduces reversible lithium ions, and leads to battery capacity decay. In the design of the negative electrode sheet in Comparative Example 1, the settings of the compacted density PD, surface density ρ, and electrode sheet porosity ε of the negative electrode sheet are unreasonable, which greatly affects the cycle life of the battery in Comparative Example 1.

In Comparative Example 2, the compacted density of the negative electrode sheet is higher, and the degree of extrusion between the material particles is increased. In this way, the porosity of the electrode sheet becomes smaller, and the electrolyte wettability of the electrode sheet may deteriorate. As such, the capacity of the material is lowered, and the liquid retention capacity of the battery is deteriorated. As the polarization of the battery increases during the cycle, the capacity decay increases, and the internal resistance may also increase significantly. In the design of the negative electrode sheet in Comparative Example 2, the settings of the compacted density PD, the surface density ρ, and the electrode sheet porosity ε of the negative electrode sheet are unreasonable, which greatly affects the cycle life of the battery in Comparative Example 2.

In Comparative Example 3, the compacted density of the negative electrode sheet is lower, the distance between particles increases, the ion channel increases, and the liquid absorption of the electrolyte solution increases, which is conducive to the rapid movement of ions. However, since the distance between particles is excessively large, the contact probability and contact area between particles are reduced, which is not conducive to electronic conduction. The decrease in conductivity affects high current discharging and increases discharging polarization. In the design of the negative electrode sheet in Comparative Example 3, the settings of the compacted density PD, the surface density ρ, and the electrode sheet porosity r of the negative electrode sheet are unreasonable, which greatly affects the cycle life of the battery in Comparative Example 3.

The above embodiments are only used to illustrate the technical solutions of the disclosure rather than to limit the protection scope of the disclosure. Although the disclosure has been described in detail with reference to the above embodiments, a person having ordinary skill in the art should understand that the technical solution of the disclosure can be modified or equivalently replaced. However, these modifications or replacements are all within the protection scope of the disclosure.

What is claimed is:

1. A negative electrode sheet, wherein:
   the negative electrode sheet comprises a current collector and a negative electrode coating disposed on two opposite surfaces of the current collector, the negative electrode coating contains a negative electrode active material, and the negative electrode active material comprises graphite, wherein a proportion of the graphite in the negative electrode coating is not less than 95% by mass percentage,
   the negative electrode coating satisfies $0.0025 \leq \varepsilon^* \rho/PD \leq 0.0065$, wherein ε is a porosity of the negative electrode coating, ρ is a surface density of a single surface of the negative electrode coating with a unit of g/cm$^2$, and PD is a compacted density of the negative electrode coating with a unit of g/cm$^3$,
   wherein the porosity ε of the negative electrode coating=25.8% to 48.6%,
   the surface density ρ of the negative electrode coating is 0.014 g/cm$^2$ to 0.024 g/cm$^2$, and
   the compacted density PD of the negative electrode coating is 1.20 g/cm$^3$ to 1.80 g/cm$^3$.

2. The negative electrode sheet according to claim 1, wherein: the negative electrode coating satisfies $0.0030 \leq \varepsilon^* \rho/PD \leq 0.0055$.

3. The negative electrode sheet according to claim 1, wherein: the porosity ε of the negative electrode coating=30% to 45%.

4. The negative electrode sheet according to claim 1, wherein: the compacted density PD of the negative electrode coating is 1.20 g/cm$^3$ to 1.70 g/cm$^3$.

5. The negative electrode sheet according to claim 1, wherein: the surface density ρ of the negative electrode coating is 0.015 g/cm$^2$ to 0.020 g/cm$^2$.

6. The negative electrode sheet according to claim 1, wherein: the negative electrode active material is subjected to a pore-forming treatment by using a pore-forming agent, so that the porosity ε of the negative electrode sheet=25.8% to 48.6%, wherein the pore-forming agent comprises at least one of paraffin microspheres, refined naphthalene, ammonium carbonate, ammonium bicarbonate, ammonium chloride, polyethylene oxide, and polymethacrylate.

7. The negative electrode sheet according to claim 6, wherein: the operation of the pore-forming treatment comprises coating a negative-electrode active slurry containing the negative-electrode active material and the pore-forming agent on the surfaces of the current collector and baking at a temperature of 70° C. to 160° C.

8. The negative electrode sheet according to claim 1, wherein: the graphite comprises at least one of natural graphite, artificial graphite, and composite graphite, and a particle diameter D50 of the graphite is 3 μm to 15 μm.

9. The negative electrode sheet according to claim 1, wherein the negative electrode sheet is prepared according to the following method:
- S1, slurry mixing, mixing the negative electrode active material with other materials used to prepare a negative electrode slurry to prepare the negative electrode slurry;
- S2, coating, coating the negative electrode slurry on the surface of the current collector, controlling a thickness of the coating to be 140 μm to 260 μm, and baking at 70° C. to 160° C. for 120 seconds to 900 seconds to obtain a semi-finished product; and
- S3, pressure rolling, pressure rolling the semi-finished product with a rolling pressure of 20T to 60T.

10. A battery, comprising a positive electrode sheet and the negative electrode sheet according to claim 1.

* * * * *